United States Patent

[11] 3,633,091

| [72] | Inventor | Richard Charles Bowers<br>Richmond, Calif. |
|---|---|---|
| [21] | Appl. No. | 19,577 |
| [22] | Filed | Mar. 16, 1970 |
| [45] | Patented | Jan. 4, 1972 |
| [73] | Assignee | Shell Oil Company<br>New York, N.Y. |

[54] ZERO TIME CONSTANT FILTER USING SAMPLE-AND-HOLD TECHNIQUE
5 Claims, 2 Drawing Figs.

[52] U.S. Cl. .................................................... 321/18,
307/261, 328/150
[51] Int. Cl. ......................................................... H02m 1/08
[50] Field of Search ........................................... 307/235,
261; 321/8, 16, 18, 47; 328/150, 151; 318/326

[56] References Cited
UNITED STATES PATENTS

| 3,363,113 | 1/1968 | Bedingfield | 328/151 X |
| 3,406,317 | 10/1968 | Gill et al. | 321/8 X |
| 3,466,526 | 9/1969 | Cole | 321/47 X |
| 3,469,111 | 9/1969 | Peters et al. | 328/151 X |
| 3,474,259 | 10/1969 | Rodgers | 307/235 X |
| 3,491,252 | 1/1970 | Petrohilos | 321/8 X |
| 3,509,372 | 4/1970 | Bicking | 307/236 |
| 3,524,075 | 8/1970 | Matthews et al. | 328/151 X |

*Primary Examiner*—William M. Shoop, Jr.
*Attorneys*—Theodore E. Bieber and J. H. McCarthy ABSTRACT: A long-standing problem in developing electronic feedback-type servosystems has been the filtering of the DC control signal without introducing time constants which comprise the usefulness of the servo. A new concept of filtering based on analog sample-and-hold techniques has been developed as a means of converting AC signals to DC control voltages with a time constant equal to a very small fraction of one cycle of the AC signal. Thus, the servo becomes a sampled data system with the control signal updated on each cycle of the AC signal.

INVENTOR:
R. C. BOWERS 3,633,091

ZERO TIME CONSTANT FILTER USING SAMPLE-AND-HOLD TECHNIQUE

BACKGROUND OF THE INVENTION

This invention is generally directed to a method and apparatus for filtering electrical signals; and more particularly, it pertains to a method and apparatus for providing a DC control signal having little or no delay from an AC feedback variable.

A longstanding problem in developing electronic control signals for feedback-type servosystems has been the filtering of an AC control signal without introducing time constants that destroy the usefulness of the servo. The problem arises where the device to be controlled requires a DC control signal, but the controlled variable is best detected by a sensor that generates an AC output signal. For example, suppose the device were a DC motor and the controlled variable were the speed of the motor. The best speed sensor, an AC tachometer, generates an AC output signal proportional to the speed of the motor, but the controller of the speed requires a DC signal.

An approach to this problem that has been used in the past is to rectify the AC signal and smooth it with R.C. filters. The problem with this approach is that the filtered signal is delayed by the filtering process. In general is requires about 10 time constant periods to properly smooth a rectified sine wave.

It is, therefore, an object of this invention to provide a new method of filtering or smoothing rectified AC.

A further object of the invention is to provide a method and apparatus for smoothing rectified AC without introducing a time delay.

Finally, it is an object of the invention to provide new circuitry for achieving the above objectives.

SUMMARY OF THE INVENTION

Generally, the objects of the invention may be achieved in the following manner. The first step is to detect the peak of the AC signal. The peak voltage is then sampled and held by a sample-and-hold circuit. The sampled voltage is then supplied as the control signal.

DESCRIPTION OF THE PREFERRED EMBODIMENT

Figure 1:
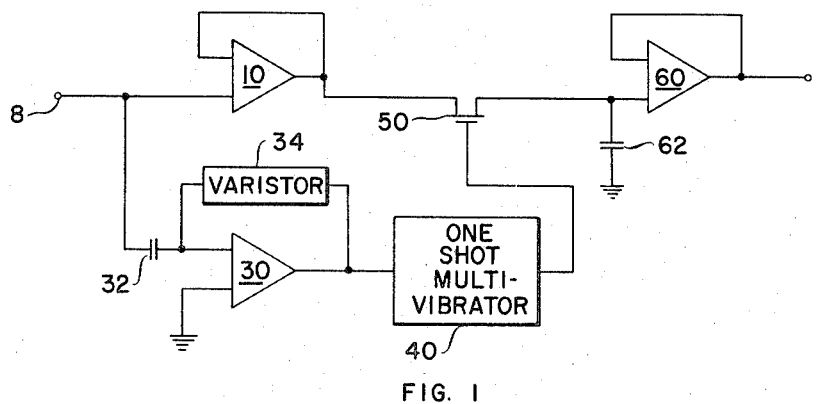
FIG. 1 is a circuit diagram illustrating a preferred embodiment of the invention.

Referring now to FIG. 1, the circuit input is marked by reference numeral 8. Input 8 is connected to the noninverting input of operational amplifier 10. Operational amplifier 10 acts as a unity gain amplifier with low-impedance output. If a conventional sine wave is applied to input 8, the output of operational amplifier 10 will be a sine wave having an amplitude the same as 8.

Figure 2:
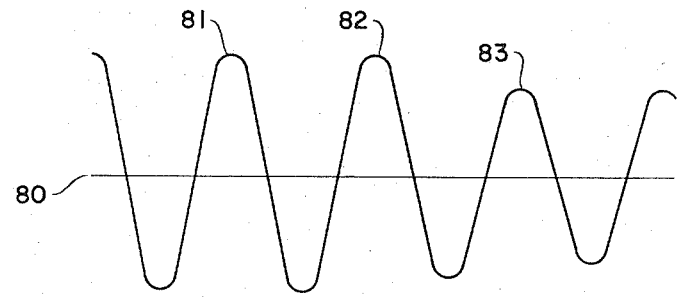
FIG. 2 shows the wave forms as they occur in various parts of the circuit.
Figure 2:
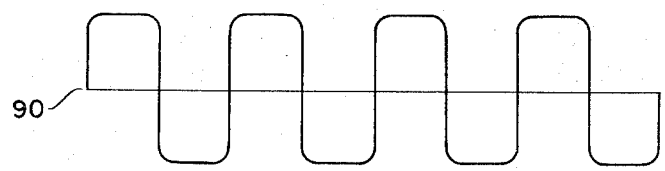
Figure 2:
Figure 2:
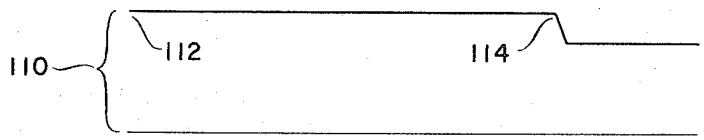

Input 8 is also connected through capacitor 32 to the inverting input of operational amplifier 30. The noninverting input to operational amplifier 30 is grounded and a varistor 34 is connected between the output of amplifier 30 and its inverting input. A varistor is a resistive element whose resistance varies with voltage in an inverse exponential manner. That is for low voltages, the resistance is very high; it decreases as the voltage across the varistor increases. Operational amplifier 30 and its associated passive elements 32 and 34 operate functionally as a differentiator. Thus, for an input sine wave at input 8, the output of operational amplifier 30 would have a distorted cosine wave form. In FIG. 2, the output of amplifier 30 is shown as wave form 90. Since the gain of operational amplifier 30 is directly proportional to the resistive value of varistor 34, the gain thereof is very high when the input voltage thereto is low. The effect of the varistor is thus to cause amplifier 30 to have a very high gain as the cosine wave passes through zero. As can be seen from wave form 90, the presence of varistor 34 distorts the cosine wave into nearly a square wave with smoothly rounded corners and very steep zero crossings. The very steep zero crossing contributes substantially to the accuracy of the circuit by enabling the zero-crossing point to be more precisely determined. It will be noted that the positive-going zero crossing on wave form 90, at points 92, 94, etc., precisely coincide with the peak values of the output signal of amplifier 10. Thus, when the zero-crossings point is detected, the peak value of the output of amplifier 10 is also detected.

In the simplified diagram the positive going signal is the trigger for the "one-shot" monostable. The output of differentiator 30 is supplied to the input of a conventional monostable multivibrator circuit, often known as a one-shot. This circuit supplies an output pulse of predetermined amplitude and pulse width each time it receives an appropriate input signal. In this case the one-shot is triggered as the output of differentiator 30 passes through zero in the positive direction. The output of single-shot 40 is supplied to the gate of a field-effect transistor 50. Field-effect transistor 50 acts as a switch for connecting the output of operational amplifier 10 to the noninverting input of operational amplifier 60. Also connected between the noninverting input to operational amplifier 60 and ground is capacitor 62. The output of operational amplifier 60 is fed back 100 percent to the inverting input. Functionally this arrangement performs a sample-and-hold operation. The peak value of the output of operational amplifier 10 is stored on capacitor 62, and operational amplifier 60 will maintain this value on its output until the charge on capacitor 62 is changed.

OPERATION OF THE INVENTION

The operation of the circuit is then as follows. An AC signal, typically a sine wave, is supplied from a sensor to input 8. Unity gain amplifier 10 acts as a low-impedance source or sink for the fast charging or discharging of capacitor 62. In FIG. 2, the input signal to the circuit is shown as wave form 80. The output of operational amplifier 10 is the same as wave form 80. The basic scheme is, of course, to sample the output of operational amplifier 10 at its peak value. This is achieved by differentiating the input signal 80 and detecting the zero-crossing point of the differentiated input signal as it appears at 90. The one-shot actuates FET switch 50 and sample-and-hold amplifier 60 then holds the peak value of wave form 80.

In FIG. 2, wave form 100 represents the output of a one-shot 40. Each pulse occurs at the zero crossing of wave form 90 and therefore at the peak value of wave form 80. The output of sample-and-hold amplifier 60 is shown by wave form 110. As an example of how the circuit might work, suppose that in wave form 80, peak value 83 is smaller than the preceding peak values 81 and 82. From time 112 to time 114, the output remains the same. At time 114, the reduced amplitude of peak value 83 is transmitted to capacitor 62 and the output of sample-and-hold circuit 60 is reduced as is shown. It will be noted that the output of sample-and-hold circuit 60 does not instantaneously change its amplitude. This is due to the time constant associated with capacitor 62 and the combination of the on-resistance of field-effect transistor 50 and the output impedance of operational amplifier 10. The value of this time constant will, of course, vary depending on the circuit elements chosen. However, practically speaking, it is extremely small relative to the frequencies of interest and very much smaller than the settle-out time associated with prior art techniques.

Where the input frequency is very low, it may be desirable to full wave rectify the input signal and thereby double the sampling rate.

I claim as my invention:

1. In a method of converting a periodic, time-varying signal to a DC signal having a magnitude of the peak value of said time-varying signal for each period, the steps comprising:
    detecting the point in time at which said first signal reaches a peak for each period by differentiating said time-varying signal; and detecting the zero-crossing time of said differentiated signal;

sampling said first signal at said point in time when it reaches a peak; and, generating a continuous DC output signal substantially equal to the peak value of said first signal.

2. An electronic near zero time constant filter circuit for receiving periodic time-varying signals and producing a DC signal having a magnitude related to the peak value of the time-varying signal for each period thereof, comprising:

peak-detecting means adapted to receive said periodic time-varying input signals and to determine the peak value thereof, including:

a differentiating circuit receiving the input signals and producing a differential signal; and a zero-crossing detector connected to receive the differential signal and to produce a sample signal when the differential signal crosses zero going from one given polarity to the other;

sample-and-hold means adapted to supply a steady DC output signal equal to a sampled input signal;

switching means operated by the sample signal and interconnecting the input of said filter circuit and the input to said sample-and-hold means; and, means interconnecting the sample signal output of said peak-detecting means and said switching means, said means adapted to actuate said switch as said time-varying signal reaches a peak value of one polarity, whereby said switching means conducts the peak value of said time-varying signal to the input of said sample-and-hold means.

3. The apparatus of claim wherein said peak-detecting means comprises:

a differentiating circuit including an operational amplifier having a varistor connected between the output of said operational amplifier and its inverting input, and a capacitor connected to said inverting input of said operational amplifier to create high-accuracy zero crossings;

a zero-crossing detector connected to the output of said differentiating circuit and adapted to supply an output signal when the output signal of said differentiating circuit crosses zero; and, a one-shot circuit connected to the output of said zero-crossing detector and adapted to supply a uniform output pulse as said sample signal in response to a signal supplied to the input thereof.

4. The apparatus of claim 3 wherein said switching means comprises a field-effect transistor having a gate electrode and two additional electrodes, said gate electrode being connected to the output of said single-SHOT circuit and the two additional electrodes interconnected between the source of said time-varying signals and the input to said sample-and-hold circuit.

5. The circuit of claim 4 wherein said sample-and-hold circuit comprises:

an operational amplifier having 100 percent feedback between its output and the inverting input thereto and a capacitor coupled between the noninverting input and ground.

* * * * *